(12) United States Patent
Takahashi (10) Patent No.: US 11,161,279 B2
(45) Date of Patent: Nov. 2, 2021

(54) SHAPED OBJECT PRODUCTION METHOD

(71) Applicant: CASIO COMPUTER CO., LTD., Tokyo (JP)

(72) Inventor: Hideki Takahashi, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 189 days.

(21) Appl. No.: 16/509,413

(22) Filed: Jul. 11, 2019

(65) Prior Publication Data

US 2020/0023559 A1  Jan. 23, 2020

(30) Foreign Application Priority Data

Jul. 20, 2018 (JP) .............................. JP2018-136791

(51) Int. Cl.
*B05D 1/14* (2006.01)
*B29C 35/08* (2006.01)
(Continued)

(52) U.S. Cl.
CPC ............... *B29C 35/08* (2013.01); *B05D 1/14* (2013.01); *B32B 5/02* (2013.01); *B32B 5/18* (2013.01);
(Continued)

(58) Field of Classification Search
CPC ..... B05C 19/001; B05C 19/002; B05D 1/007; B05D 1/04; B05D 1/045; B05D 1/06;
(Continued)

(56) References Cited

U.S. PATENT DOCUMENTS 3,591,401 A * 7/1971 Snyder ...................... B44C 1/24
428/88
3,943,018 A * 3/1976 Petry .................... D06N 7/0007
156/79

(Continued)

FOREIGN PATENT DOCUMENTS

JP  S58151250 A  9/1983
JP  S61014945 A  1/1986
(Continued)

OTHER PUBLICATIONS

Japanese Office Action (and English language translation thereof) dated Nov. 10, 2020 issued in counterpart Japanese Application No. 2018-136791.
(Continued)

*Primary Examiner* — Michael A Tolin
(74) *Attorney, Agent, or Firm* — Holtz, Holtz & Volek PC (57) ABSTRACT

A shaped object production method includes a first preparation step (S30) of preparing a molding sheet that includes a base, a thermally expansive layer laminated on a first main surface of the base, the thermally expansive layer including a thermally expandable material, and a brushed layer laminated on a surface of the thermally expansive layer on a side that is opposite to the base, the brushed layer including fiber; a first heat conversion layer laminating step (S40) of laminating a heat conversion layer that converts electromagnetic waves into heat onto a surface of the molding sheet on a side that is opposite to the brushed layer; and a first unevenness forming step (S50) of forming an unevenness on the surface of the thermally expansive layer on the side that is opposite to the base by irradiating the heat conversion layer with electromagnetic waves, thereby causing the thermally expandable material to expand.

14 Claims, 9 Drawing Sheets

(51) Int. Cl.
  *B29K 105/04* (2006.01)
  *B32B 27/12* (2006.01)
  *B32B 5/18* (2006.01)
  *B32B 5/24* (2006.01)
  *B32B 7/06* (2019.01)
  *B32B 7/12* (2006.01)
  *B32B 5/02* (2006.01)
  *B32B 38/00* (2006.01)

(52) U.S. Cl.
  CPC .............. *B32B 5/245* (2013.01); *B32B 7/06* (2013.01); *B32B 7/12* (2013.01); *B32B 27/12* (2013.01); *B29K 2105/04* (2013.01); *B32B 2038/0084* (2013.01); *B32B 2262/0261* (2013.01)

(58) Field of Classification Search
  CPC ........ B05D 1/14; B05D 1/16; B29C 35/0266; B29C 35/08; B29C 35/0805; B29C 2035/0822; B29C 2035/0833; B29C 37/0075; B29C 44/00; B29C 44/02; B29C 44/022; B29C 44/06; B29C 44/12; B29C 44/3415; B29K 2023/00; B29K 2023/06; B29K 2023/12; B29K 2067/00; B29K 2067/003; B29K 2067/006; B29K 2105/0076; B29K 2105/04; B29K 2105/048; B32B 5/02; B32B 5/022; B32B 5/0245; B32B 5/18; B32B 5/20; B32B 7/06; B32B 7/12; B32B 27/12; B32B 2038/0084; B32B 2262/0261; B32B 5/245; D06N 7/0002; D06N 7/0007; D06N 7/0013; D06N 7/0097; Y10T 428/23907; Y10T 428/23943
  See application file for complete search history.

(56) References Cited

U.S. PATENT DOCUMENTS

| | | | |
|---|---|---|---|
| 5,846,622 A * | 12/1998 | Imaeda | B32B 7/06 428/40.1 |
| 7,897,236 B2 * | 3/2011 | Merovitz | A41D 19/0058 428/90 |
| 9,522,490 B2 * | 12/2016 | Horiuchi | B29C 44/0461 |
| 2009/0130451 A1* | 5/2009 | Farrell | C08K 3/30 428/411.1 |
| 2015/0090288 A1* | 4/2015 | Chudzik | B05D 1/007 132/273 |
| 2017/0362750 A1 | 12/2017 | Sasase et al. | |
| 2017/0368721 A1 | 12/2017 | Saito | |

FOREIGN PATENT DOCUMENTS

| | | |
|---|---|---|
| JP | H01249434 A | 10/1989 |
| JP | H02305633 A | 12/1990 |
| JP | 2000290881 A | 10/2000 |
| JP | 2016124185 A | 7/2016 |

OTHER PUBLICATIONS

Chinese Office Action (and English language translation thereof) dated Mar. 30, 2021 issued in counterpart Chinese Application No. 201910633983.5.

* cited by examiner

SHAPED OBJECT PRODUCTION METHOD

CROSS-REFERENCE TO RELATED APPLICATION

This application claims the benefit of Japanese Patent Application No. 2018-136791, filed on Jul. 20, 2018, the entire disclosure of which is incorporated by reference herein.

FIELD

The present disclosure relates generally to a shaped object production method for a shaped object that uses a thermally expandable material that distends due to heat.

BACKGROUND

In the related art, Unexamined Japanese Patent Application Kokai Publication No. H01-249434, for example, describes a molded object on which fiber is fixed by an adhesive in order to soften the texture/feel of the molded object. Unexamined Japanese Patent Application Kokai Publication No. H02-305633 describes a production method for producing a molded object that includes a brushed surface. The method described in Unexamined Japanese Patent Application Kokai Publication No. H02-305633 includes forming a base coating on a molded object and, thereafter, affixing fiber to the molded object by applying a fiber-containing fabric coating agent.

In Patent Literatures 1 and 2, fiber is fixed (adhered) to a molded object. As such, when the surface of the molded object includes fine unevennesses, the adherence of the fiber to the surface of the molded object is more likely to be inconsistent. Meanwhile, if the base on which the fiber is adhered is subjected to unevenness processing (for example, embossing), there is a risk of the fiber deteriorating, degenerating, or the like.

The present disclosure is made with the view of the above situation, and an objective of the present disclosure is to provide a shaped object production method for a shaped object that includes a uniform brushed layer on a surface that includes unevennesses. Another object of the present disclosure is to provide a shaped object production method for a shaped object that includes at least one of thermal insulating properties, soundproofing properties, hygroscopic properties, and braking properties.

SUMMARY

According to an aspect of the present disclosure, a shaped object production method includes a first preparation step of preparing a molding sheet including a base, a thermally expansive layer that is laminated on a first main surface of the base, the thermally expansive layer including a thermally expandable material, and a brushed layer that is laminated on a surface of the thermally expansive layer on a side that is opposite to the base, the brushed layer including fiber, a first heat conversion layer laminating step of laminating a heat conversion layer onto a surface of the molding sheet on a side that is opposite to the brushed layer, the heat conversion layer converting electromagnetic waves into heat, and a first unevenness forming step of forming an unevenness on the surface of the thermally expansive layer on the side that is opposite to the base by irradiating the heat conversion layer with electromagnetic waves, thereby causing the thermally expandable material to expand.

According to another aspect of the present disclosure, a shaped object production method includes a second preparation step of preparing a molding sheet including a base and a thermally expansive layer that is laminated on a first main surface of the base, the thermally expansive layer including a thermally expandable material, a brushed layer laminating step of laminating a brushed layer onto a surface of the thermally expansive layer on a side that is opposite to the base, the brushed layer including fiber, a second heat conversion layer laminating step of laminating a heat conversion layer onto a surface of the molding sheet on a side that is opposite to the thermally expansive layer or onto the surface of the thermally expansive layer on the side that is opposite to the base, the heat conversion layer converting electromagnetic waves into heat, and a second unevenness forming step of forming an unevenness on the surface of the thermally expansive layer on the side that is opposite to the base by irradiating the heat conversion layer with electromagnetic waves, thereby causing the thermally expandable material to expand.

According to yet another aspect of the present disclosure, a shaped object production method includes a thermally expansive layer laminating step of laminating a thermally expansive layer onto a first main surface of a base, the thermally expansive layer including a thermally expandable material, a brushed layer laminating step of laminating a brushed layer onto a surface of the thermally expansive layer on a side that is opposite to the base, a second heat conversion layer laminating step of laminating a heat conversion layer onto a surface of the base on a side that is opposite to the thermally expansive layer or onto the surface of the thermally expansive layer on the side that is opposite to the base, the heat conversion layer converting electromagnetic waves into heat, and a second unevenness forming step of forming an unevenness on the surface of the thermally expansive layer on the side that is opposite to the base by irradiating the heat conversion layer with electromagnetic waves, thereby causing the thermally expandable material to expand.

According to the present disclosure, a shaped object production method for a shaped object that includes a uniform brushed layer on a surface that includes unevennesses can be provided. Additionally, according to the present disclosure, a shaped object production method for a shaped object that includes at least one of thermal insulating properties, soundproofing properties, hygroscopic properties, and braking properties can be provided.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a shaped object production method according to the present disclosure is described with reference to the drawings.

Embodiment 1

In the present embodiment, a shaped object 100 is produced from a molding sheet 10. The shaped object 100 is used as a decorative sheet, wallpaper, or the like. In the present description, the term "shaped object" refers to a sheet that includes unevennesses shaped (formed) on a predetermined surface. The unevennesses form geometrical shapes, characters, patterns, decorations, or the like. The term "decorations" refers to objects that appeal to the aesthetic sense through visual and/or tactile sensation. The term "shaped (or molded)" refers to the forming of a shaped object, and should be construed to also include concepts such as decorating and ornamenting. The shaped object of the present embodiment is a three-dimensional object that includes unevennesses on a predetermined side. However, to distinguish this three-dimensional object from three-dimensional objects formed using a so-called 3D printer, the shaped object of the present embodiment is called a 2.5-dimensional (2.5D) object or a pseudo-three-dimensional (Pseudo-3D) object. Moreover, the technique used to produce the shaped object of the present embodiment is called 2.5D printing or Pseudo-3D printing.

Molding Sheet

Figure 1:
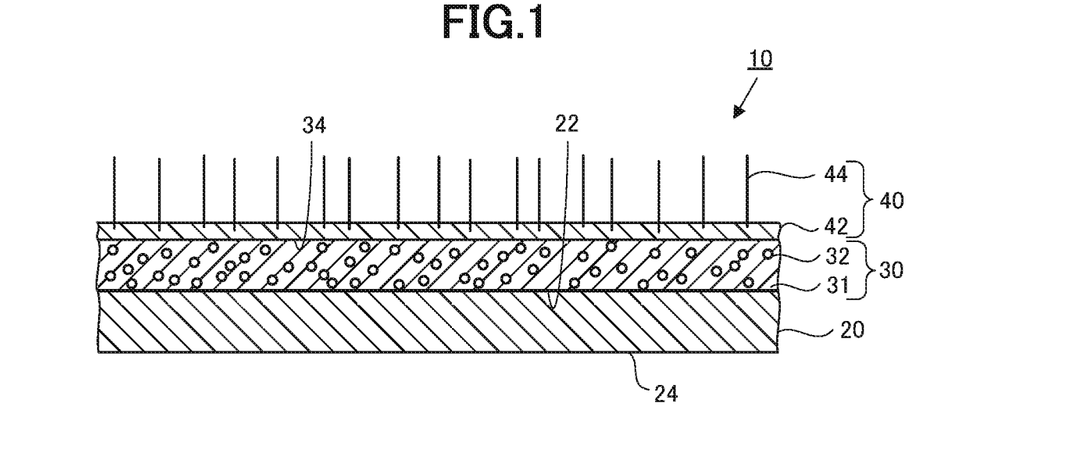
FIG. 1 is a schematic drawing illustrating a cross-section of a molding sheet according to Embodiment 1 of the present disclosure.
Figure 2:
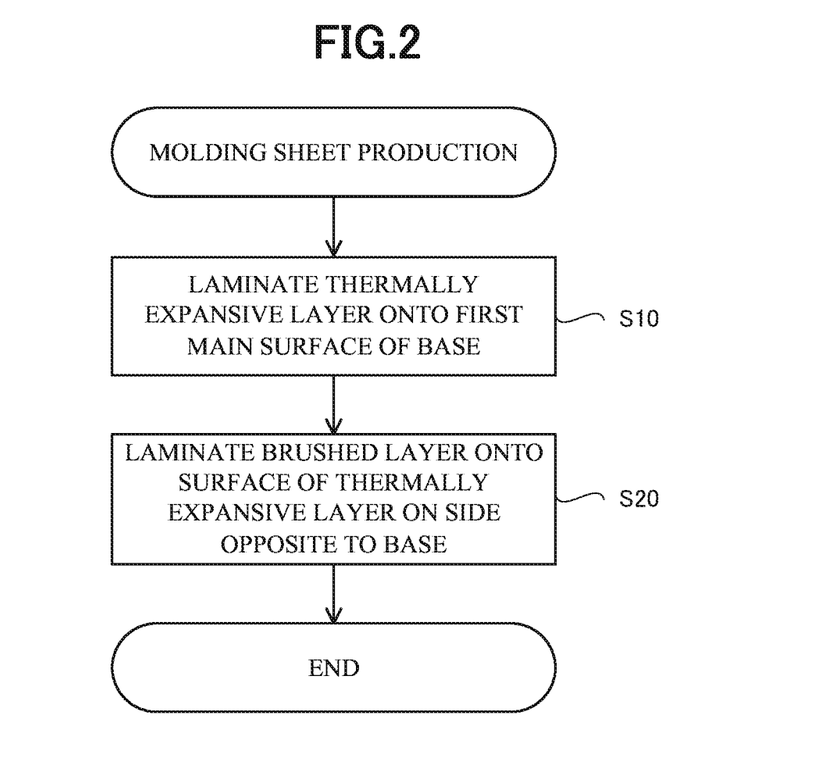
FIG. 2 is a flowchart illustrating a production method for the molding sheet according to Embodiment 1 of the present disclosure.

First, the molding sheet 10 will be described with reference to FIGS. 1 and 2. As illustrated in FIG. 1, the molding sheet 10 includes a base 20, a thermally expansive layer 30 laminated on a first main surface 22 of the base 20, and a brushed layer 40 laminated on the thermally expansive layer 30.

The base 20 of the molding sheet 10 includes the first main surface 22, on which the thermally expansive layer 30 is formed, and a second main surface 24 on a side opposite to the first main surface 22. The base 20 supports the thermally expansive layer 30. In one example, the base 20 is formed in a sheet-like shape. Examples of the material of the base 20 include thermoplastic resins such as polyolefin resins (polyethylene (PE), polypropylene (PP), and the like) and polyester resins (polyethylene terephthalate (PET), polybutylene terephthalate (PBT), and the like). The type of material of the base 20 and the thickness of the base 20 are selected according to the intended application of the shaped object 100.

The thermally expansive layer 30 of the molding sheet 10 is provided on the first main surface 22 of the base 20. The thermally expansive layer 30 includes a binder 31 and a thermally expandable material (undistended thermally expandable material) 32 dispersed in the binder. Any thermoplastic resin, such as a vinyl acetate polymer or an acrylic polymer, may be used as the binder 31. The thermally expandable material 32 expands as a result of being heated to a predetermined temperature or higher, and expands a magnitude according to the heat amount heated with (specifically, the heating temperature, the heating time, and the like). In one example, the thermally expandable material 32 expands as a result of being heated to 80° C. to 120° C. or higher. In one example, the thermally expandable material 32 is implemented as thermally expandable microcapsules.

The thermally expandable microcapsules are microcapsules that include shells made from a thermoplastic resin. A foaming agent made from propane, butane, or a similar low boiling point substance is encapsulated in the shells of the microcapsules. The shells of the thermally expandable microcapsules are formed from a thermoplastic resin such as, for example, polystyrene, polyvinyl chloride, polyvinylidene chloride, polyvinyl acetate, polyacrylic acid ester, polyacrylonitrile, polybutadiene, and copolymers thereof. When the thermally expandable microcapsules are heated to the predetermined temperature or higher, the shells soften and the foaming agent vaporizes. The pressure resulting from the vaporization of the foaming agent causes the shells to expand in a balloon-like manner. The thermally expandable microcapsules expand to a size about five-times larger than that prior to expansion. In one example, the average particle size of the thermally expandable microcapsules prior to expansion is about 5 to 50 m.

The thermally expansive layer 30 distends due to the expansion of the thermally expandable material 32, and an unevenness 39 (described later) is formed on a surface 34 of the thermally expansive layer 30 on the side opposite to the base 20. The formation of the unevenness 39 will be described later.

The brushed layer 40 of the molding sheet 10 is laminated on the surface 34 of the thermally expansive layer 30 on the side opposite to the base 20. The brushed layer 40 includes an adhesive layer 42 laminated on the surface 34 of the thermally expansive layer 30, and fiber 44 that is flocked on the adhesive layer 42.

In one example, the adhesive layer 42 of the brushed layer 40 is formed from an (acrylic-based, urethane-based, or the like) ultraviolet curable adhesive. It is preferable that the adhesive layer 42 have a coefficient of extension of 30% or greater so that the thermally expandable material 32 of the thermally expansive layer 30 will expand and the unevenness 39 will form on the surface 34 of the thermally expansive layer 30.

In one example, the fiber 44 of the brushed layer 40 is implemented as fibers that have a length of 100 μm to 5 mm. The fiber 44 is formed from nylon 66, rayon, or the like. In one example, the fiber 44 is flocked on the adhesive layer 42 at a density of 50,000 to 50,000,000 fibers per 1 m$^2$.

Next, a production method for the molding sheet 10 will be described. FIG. 2 is a flowchart illustrating the production method for the molding sheet 10. The production method for the molding sheet 10 includes a thermally expansive layer laminating step of laminating the thermally expansive layer 30 onto the first main surface 22 of the base 20 (step S10), and a first brushed layer laminating step of laminating the brushed layer 40 onto the surface 34 of the thermally expansive layer 30 on the side opposite to the base 20 (step S20).

In the thermally expansive layer laminating step (step S10), first, the base 20 and a coating liquid for forming the thermally expansive layer 30 are prepared. The base 20 may be in a roll shape, or may be cut, in advance, into sheets. The coating liquid for forming the thermally expansive layer 30 is prepared by mixing the binder 31 with the thermally expandable material 32 (for example, the thermally expandable microcapsules).

Next, the coating liquid is coated on the first main surface 22 of the base 20 using a coating device. Then, the coating liquid that is coated on the first main surface 22 of the base is dried. As a result, the thermally expansive layer 30 is formed on the first main surface 22 of the base 20. Examples of the coating device include bar coaters, roller coaters, and spray coaters. Note that the coating of the coating liquid and the drying of the coating liquid may be repeated in order to obtain a thermally expansive layer 30 that has a predetermined thickness.

In the first brushed layer laminating step (step S20), first, the ultraviolet curable adhesive is coated on the surface 34 of the thermally expansive layer 30 on the side opposite to the base 20 using a coating device such as a bar coater, a roller coater, or the like. Next, the fiber 44 is flocked on the ultraviolet curable adhesive. In one example, the fiber 44 is flocked by electrostatic flocking. Specifically, high voltage is applied between electrodes where the fiber 44 flies about. The base 20, having the ultraviolet curable adhesive coated on the thermally expansive layer 30, is inserted between electrodes where the fiber 44 is flying about. Thus, the fiber 44 sticks into and is flocked on the ultraviolet curable adhesive. Finally, the ultraviolet curable adhesive on which the fiber 44 is flocked is irradiated with ultraviolet (UV) light, thereby causing the ultraviolet curable adhesive to cure. As a result, the adhesive layer 42 is formed. It is preferable that the coefficient of extension of the ultraviolet curable adhesive after curing (that is, the coefficient of extension of the adhesive layer 42 formed from the ultraviolet curable adhesive) is 30% or greater so that the unevenness 39 will be formed on the surface 34 of the thermally expansive layer 30 in the production of the shaped object 100.

The molding sheet 10 is produced as described above. In cases in which the thermally expansive layer 30 and the brushed layer 40 are laminated on a roll-shaped base 20, the base on which the thermally expansive layer 30 and the brushed layer 40 are laminated may be cut to a desired size.

Figure 3:
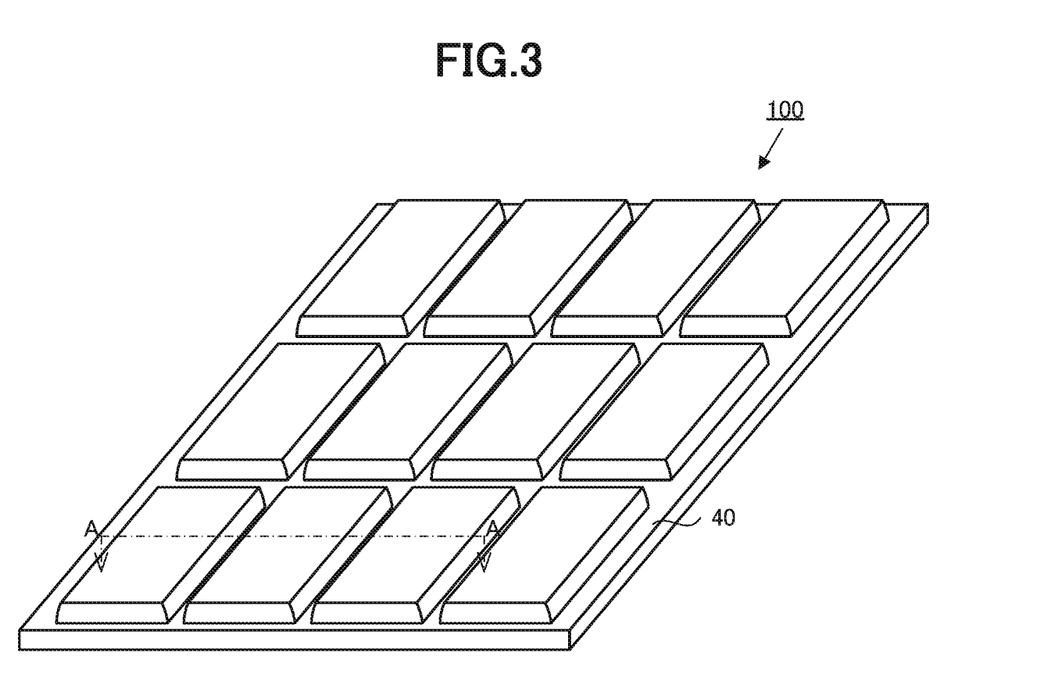
FIG. 3 is a perspective view illustrating a shaped object according to Embodiment 1 of the present disclosure.
Figure 4:
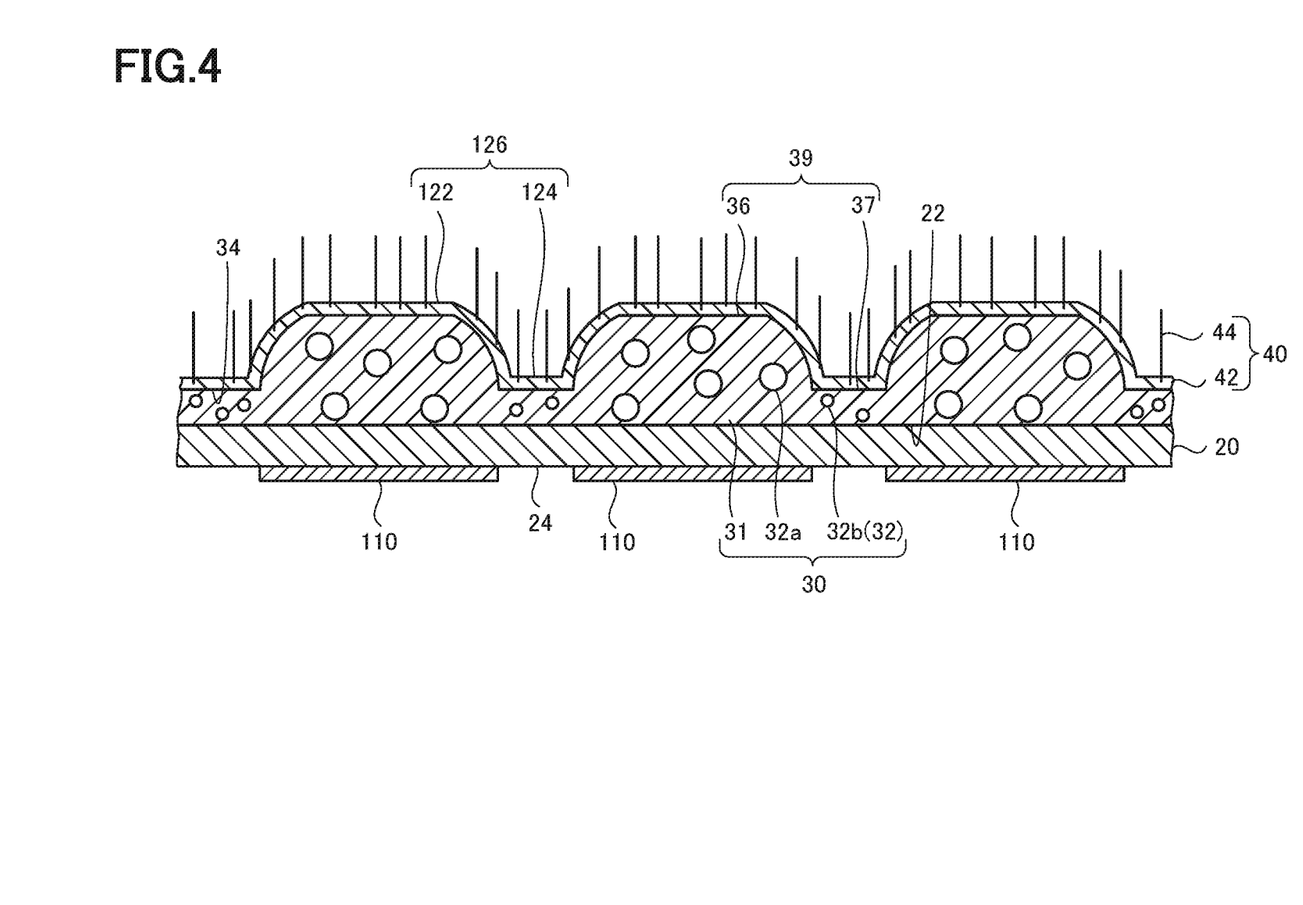
FIG. 4 is a cross-sectional view of the shaped object depicted in FIG. 3, taken along line A-A.

Shaped Object Next, the shaped object 100 will be described with reference to FIGS. 3 and 4. As illustrated in FIG. 4, the shaped object 100 includes a base 20; a thermally expansive layer 30 laminated on the first main surface 22 of the base 20, the thermally expansive layer 30 including the unevenness 39 on the surface 34 on the side that is opposite to the base 20; a brushed layer 40 laminated on the surface 34 of the thermally expansive layer 30 on the side opposite to the base 20; and a heat conversion layer 110 on the second main surface 24 of the base 20 on the side opposite to the first main surface 22, the heat conversion layer 110 being laminated in a pattern that corresponds to the unevenness 39. As illustrated in FIGS. 3 and 4, the shaped object 100 is a sheet-like shaped object. The shaped object 100 includes an unevenness 126 on the surface. The unevenness 126 has a protrusion 122 and a recess 124. Since the configuration of the base 20 of the shaped object 100 is similar to the base 20 of the molding sheet 10, the thermally expansive layer 30, the brushed layer 40, and the heat conversion layer 110 of the shaped object 100 will be described.

The thermally expansive layer 30 of the shaped object 100 is provided on the first main surface 22 of the base 20, similar to the thermally expansive layer 30 of the molding sheet 10. The thermally expansive layer 30 of the shaped object 100 includes a binder 31, an expanded thermally expandable material 32a, and an unexpanded thermally expandable material 32b (that is, the thermally expandable material 32 of the molding sheet 10). Additionally, the thermally expansive layer 30 of the shaped object 100 includes an unevenness 39 on the surface 34 on the side that is opposite to the base 20. The unevenness 39 has a protrusion 36 that includes the binder 31 and the expanded thermally expandable material 32a, and a recess 37 that includes the binder 31 and the unexpanded thermally expandable material 32b. The protrusion 36 is a portion where the thermally expansive layer of the molding sheet 10 distended due to the expansion of the thermally expandable material 32, and corresponds to a portion where the thickness of the thermally expansive layer of the shaped object 100 is thick. The recess 37 is a portion where the thermally expansive layer 30 of the molding sheet 10 did not distend, and corresponds to a portion where the thickness is less than the thickness of the protrusion 36.

As with the brushed layer 40 of the molding sheet 10, the brushed layer 40 of the shaped object 100 includes an adhesive layer 42 laminated on the surface 34 of the thermally expansive layer 30 on the side opposite to the base 20, and fiber 44 that is flocked on the adhesive layer 42. The brushed layer 40 of the shaped object 100 is laminated on the surface 34 of the thermally expansive layer 30 and covers the thermally expansive layer 30 along the uneven shape of the unevenness 39.

The heat conversion layer 110 of the shaped object 100 is laminated on the second main surface 24 of the base 20. The heat conversion layer 110 is laminated in a pattern that corresponds to the unevenness 39 on the surface 34 of the thermally expansive layer 30. The heat conversion layer 110 converts irradiated electromagnetic waves into heat and releases the converted heat, thereby heating the thermally expandable material 32 of the molding sheet 10. The heated thermally expandable material 32 of the molding sheet 10 expands a magnitude according to the heating temperature, the heating time, and the like. As a result, the expanded thermally expandable material 32a is formed, and the thermally expansive layer 30 of the molding sheet 10 distends. The heat conversion layer 110 converts electromagnetic waves into heat faster than the other portions of the molding sheet 10. As such, it is possible to selectively heat the thermally expansive layer 30 (the thermally expandable material 32) near the heat conversion layer 110.

The heat conversion layer 110 is formed from a heat conversion material that absorbs and converts electromagnetic waves into heat. Examples of the heat conversion material include carbon black, metal hexaboride compounds, and tungsten oxide compounds. Carbon black, for example, absorbs and converts visible light, infrared light, and the like into heat. Metal hexaboride compounds and tungsten oxide compounds absorb and convert near-infrared light into heat. Among the metal hexaboride compounds and the tungsten oxide compounds, lanthanum hexaboride ($LaB_6$) and cesium tungsten oxide are preferable from the perspectives of obtaining high light absorptivity in the near-infrared region and high transmittance in the visible light spectrum.

Next, a production method for the shaped object 100 will be described with reference to FIGS. 5 and 6. In the present embodiment, the shaped object 100 is produced from a sheet-like (for example, A4 paper size) molding sheet 10.

Figure 5:
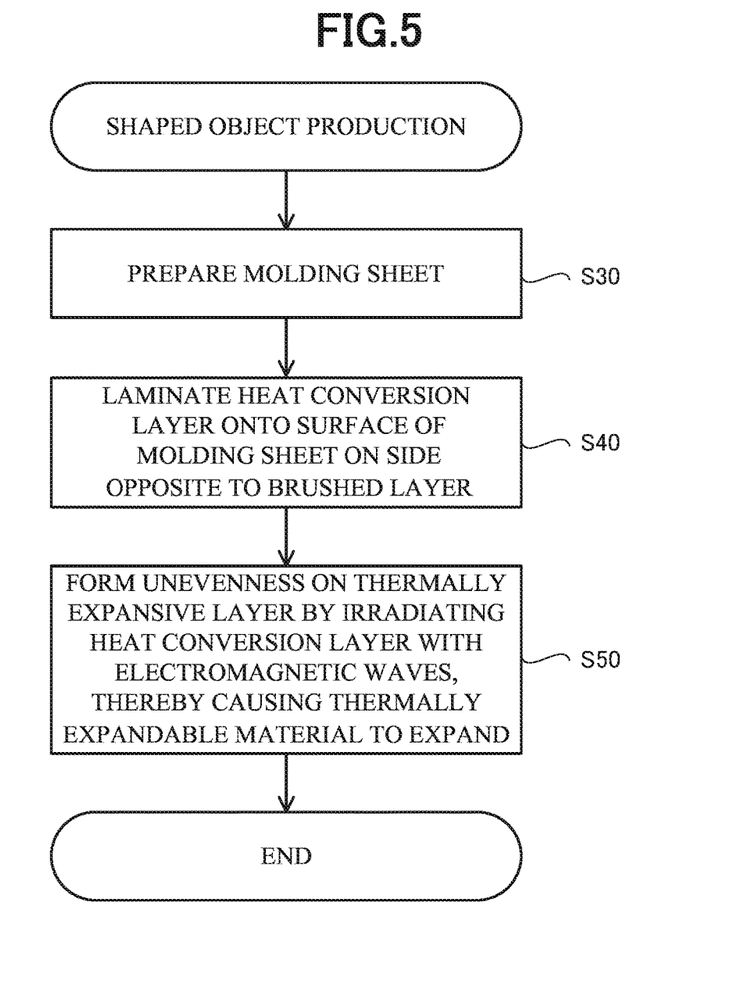
FIG. 5 is a flowchart illustrating a production method for the shaped object according to Embodiment 1 of the present disclosure.
Figure 6:
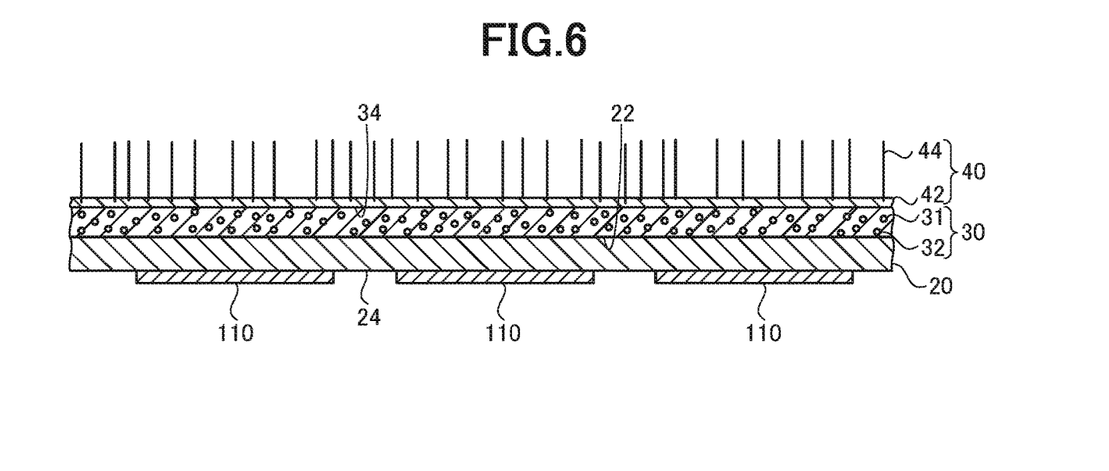
FIG. 6 is a schematic drawing illustrating a cross-section of the molding sheet according to Embodiment 1 of the present disclosure, on which a heat conversion layer is laminated.

FIG. 5 is a flowchart illustrating the production method for the shaped object 100. The production method for the shaped object 100 includes a first preparation step of preparing the molding sheet 10 that includes the base 20, the thermally expansive layer 30 laminated on the first main surface 22 of the base 20, and the brushed layer 40 laminated on the thermally expansive layer 30 (step S30); a first heat conversion layer laminating step of laminating the heat conversion layer 110 that converts electromagnetic waves into heat onto the surface of the molding sheet 10 on the side opposite to the brushed layer 40 (that is, the second main surface 24 of the base 20) (step S40); and a first unevenness forming step of irradiating the heat conversion layer 110 with electromagnetic waves to cause the thermally expandable material 32 of the molding sheet 10 to expand, thereby forming the unevenness 39 on the surface 34 of the thermally expansive layer 30 on the side opposite to the base 20 (step S50).

In the first preparation step (step S30), first, the molding sheet 10 and an ink containing the heat conversion material are prepared. In one example, the molding sheet 10 is produced via the production method for the molding sheet 10 described above (step S10 and step S20). The ink that contains the heat conversion material is carbon black-containing ink, for example.

Next, in the first heat conversion layer laminating step (step S40), the carbon black-containing ink is printed, in a pattern that corresponds to the unevenness 39 to be formed on the surface 34 of the thermally expansive layer 30, on the second main surface 24 of the base (that is, on the surface of the molding sheet 10 on the side opposite to the brushed layer 40) by the printing device. As a result, as illustrated in FIG. 6, the heat conversion layer 110 is laminated on the second main surface 24 of the molding sheet 10. In one example, the printing device is an ink jet printer.

Here, the amount of heat released from the heat conversion layer 110 is dependent on the density (or concentration) of the carbon black and the amount of energy per unit area and per unit time of the electromagnetic waves irradiated on the heat conversion layer 110. Accordingly, the uneven shape of the unevenness 39 (the shape and the height of the protrusion 36 and the shape and the depth of the recess 37) to be formed on the surface 34 of the thermally expansive layer 30 can be controlled by the density of the carbon black-containing ink and the amount of energy per unit area and per unit time of the electromagnetic waves that are irradiated.

Returning to FIG. 5, in the first unevenness forming step (step S50), the heat conversion layer 110 is irradiated with electromagnetic waves, thereby causing heat to be released and the thermally expandable material 32 of the molding sheet 10 to expand. As a result, the unevenness 39 is formed on the surface 34 of the thermally expansive layer 30 on the side opposite to the base 20. Specifically, the heat conversion layer 110 is irradiated with visible light, infrared light, or the like at an amount of energy that corresponds to the uneven shape of the unevenness 39, and the carbon black absorbs this light. Here, the visible light, infrared light, or the like is irradiated from an irradiation device (not illustrated in the drawings). As a result, the thermally expandable material 32 included in the portion of the thermally expansive layer 30 that corresponds to the pattern of the heat conversion layer 110 (the portion that corresponds to the protrusion 36) is selectively heated, and the expanded thermally expandable material 32a is formed in the portion of the thermally expansive layer that corresponds to the pattern of the heat conversion layer 110. Moreover, the portion of the thermally expansive layer 30 that corresponds to the pattern of the heat conversion layer 110 distends and, as a result, the protrusion 36 and the recess 37 are formed, and the unevenness 39 is formed on the surface 34 of the thermally expansive layer 30. Furthermore, due to the unevenness 39 being formed on the surface 34 of the thermally expansive layer 30, the unevenness 126 is formed on the surface of the shaped object 100. In the present embodiment, the coefficient of extension of the adhesive layer 42 of the brushed layer 40 is 30% or greater and, as such, the adhesive layer 46 extends when the thermally expandable material 32 (the thermally expansive layer 30) of the molding sheet 10 distends. As a result, the unevenness 39 can be easily formed on the surface 34 of the thermally expansive layer 30. In addition, the unevenness 126 can be easily formed on the surface of the shaped object 100 (that is, on the front surface of the brushed layer 40). Thus, the shaped object 100 can be produced.

In the present embodiment, the thermally expandable material 32 is caused to expand, and this expansion causes the thermally expansive layer 30 laminated on the brushed layer 40 to distend, thereby forming the unevenness 39. As such, the shaped object 100 includes a uniform brushed layer 40 on the surface 34 that includes the unevenness 39. Additionally, with the production method of the shaped object 100 of the present embodiment, a shaped object 100 that includes a uniform brushed layer 40 on the surface 34 that includes the unevenness 39 can easily be produced.

Embodiment 2

In Embodiment 1, the recess 37 of the thermally expansive layer 30 includes the unexpanded thermally expandable material 32b, but the recess of the thermally expansive layer 30 is not limited to the unexpanded thermally expandable material 32b. It is sufficient that the recess 37 includes a thermally expandable material that is expanded less that the expanded thermally expandable material 32a of the protrusion 36.

Figure 7:
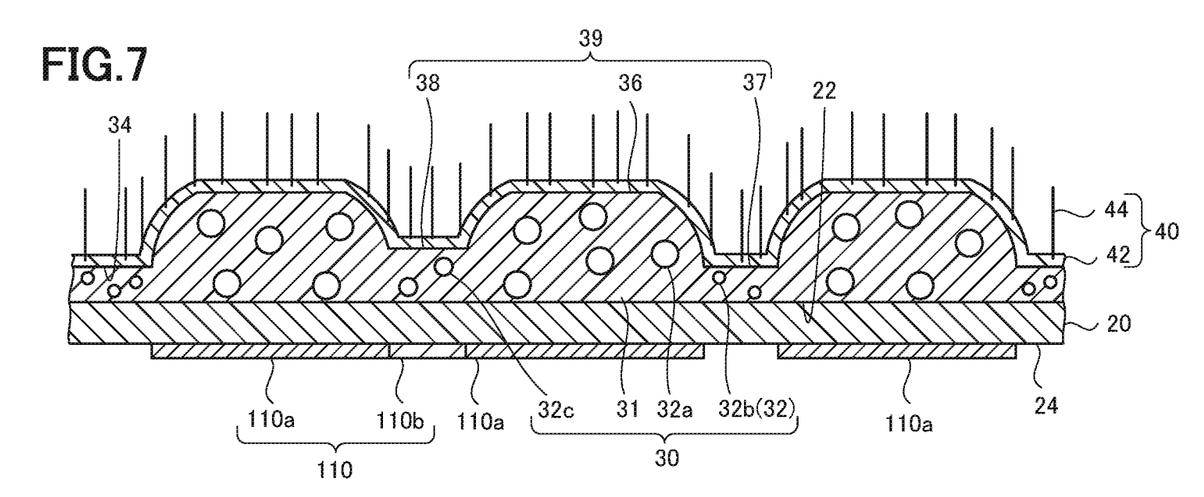
FIG. 7 is a schematic drawing illustrating a cross-section of a shaped object according to Embodiment 2 of the present disclosure.

A shaped object 100 of the present embodiment is formed from the molding sheet 10 of Embodiment 1, similar to the shaped object 100 of Embodiment 1. As illustrated in FIG. 7, the shaped object 100 of the present embodiment includes a base 20, a thermally expansive layer 30 that includes an unevenness 39 on a surface 34 of a side opposite to the base 20, a brushed layer 40, and a heat conversion layer 110. The unevenness 39 of the thermally expansive layer 30 of the present embodiment has a protrusion 36, a recess 37, and a recess 38 of the thermally expansive layer 30. The base 20 and the brushed layer 40 of the present embodiment are similar to the base 20 and the brushed layer 40 of Embodiment 1 and, as such, the thermally expansive layer 30 and the heat conversion layer 110 will be described.

In the present embodiment, the thermally expansive layer 30 of the shaped object 100 is laminated on a first main surface 22 of the base 20. The thermally expansive layer 30 of the shaped object 100 includes a binder 31, expanded thermally expandable material 32a, unexpanded thermally expandable material 32b, and thermally expandable material 32c that is expanded less than the expanded thermally expandable material 32a. Additionally, the thermally expansive layer 30 of the shaped object 100 includes an unevenness 39 on the surface 34 that is on the side opposite to the base 20. The unevenness 39 on the surface 34 has the protrusion 36, the recess 37, and the recess 38. The protrusion 36 includes the expanded thermally expandable material 32a. The recess 37 and the recess 38 respectively include the unexpanded thermally expandable material 32b, and thermally expandable material 32c that is expanded less than the expanded thermally expandable material 32a. The protrusion 36 is a portion where the thermally expansive layer 30 of the molding sheet 10 distended due to the expansion of the thermally expandable material 32, and corresponds to a portion where the thickness of the thermally expansive layer 30 of the shaped object 100 is thick. The recess 38 corresponds to a portion where the thickness is less than the thickness of the protrusion 36. The recess 37 corresponds to a portion where the thickness is less than the thicknesses of the protrusion 36 and the recess 38.

As in Embodiment 1, the heat conversion layer 110 of the shaped object 100 is laminated on the second main surface 24 of the base 20. The heat conversion layer 110 is laminated in a pattern that corresponds to the unevenness 39 of the thermally expansive layer 30. The heat conversion layer 110 of the present embodiment includes a high density portion 110a where the density of the heat conversion material is high and a low density portion 100b where the density of the heat conversion material is low. The high density portion 110a where the density of the heat conversion material is high corresponds to the protrusion 36 of the thermally expansive layer 30, and the low density portion 110b where the density of the heat conversion material is low corresponds to the recess 38 of the thermally expansive layer 30. The other configurations of the heat conversion layer 110 of the present embodiment are similar to that described in Embodiment 1.

Next, a production method of the shaped object 100 according to the present embodiment will be described. The production method for the shaped object 100 of the present embodiment includes the first preparation step (step S30), the first heat conversion layer laminating step (step S40), and the first unevenness forming step (step S50) illustrated in FIG. 5, similar to the production method of Embodiment 1.

In the first preparation step (step S30), the molding sheet 10 and the heat conversion material-containing ink are prepared in a manner similar to that in the preparation step (step S30) of Embodiment 1.

Figure 8:
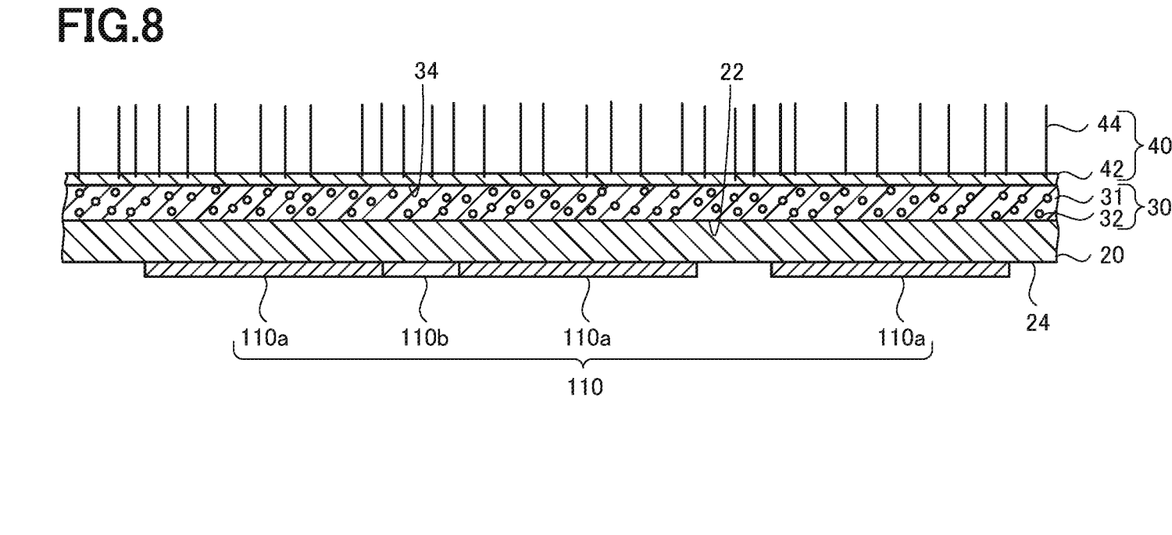
FIG. 8 is a schematic drawing illustrating a cross-section of the molding sheet according to Embodiment 2 of the present disclosure, on which a heat conversion layer is laminated.

Next, as in Embodiment 1, in the first heat conversion layer laminating step (step S40), the carbon black-containing ink is printed, in a pattern that corresponds to the unevenness 39 to be formed on the surface 34 of the thermally expansive layer 30, on the second main surface 24 of the base 20. In the present embodiment, the portion of the heat conversion layer 110 that corresponds to the recess 38 of the thermally expansive layer 30 is printed lighter (that is, the density of the carbon black is lower) than the portion of the heat conversion layer 110 that corresponds to the protrusion 36 of the thermally expansive layer 30. Thus, as illustrated in FIG. 8, the heat conversion layer 110 is laminated on the second main surface 24 of the base 20. The heat conversion layer 110 includes the high density portion 110a where the density of the heat conversion material is high, which corresponds to the protrusion 36 of the thermally expansive layer 30, and the low density portion 110b where the density of the heat conversion material is low, which corresponds to the recess 38 of the thermally expansive layer 30.

In the first unevenness forming step (step S50), as in Embodiment 1, the heat conversion layer 110 is irradiated with electromagnetic waves at an amount of energy that corresponds to the uneven shape of the unevenness 39, and the carbon black absorbs this light, thereby causing heat to be released and the thermally expandable material 32 of the molding sheet 10 to expand. As a result, the unevenness 39 is formed on the surface 34 of the thermally expansive layer 30 on the side opposite to the base 20. In the present embodiment, the heat conversion layer 110 includes the high density portion 110a where the density of the heat conversion material is high, which corresponds to the protrusion 36 of the thermally expansive layer 30, and the low density portion 110b where the density of the heat conversion material is low, which corresponds to the recess 38 of the thermally expansive layer 30. Accordingly, the expanded thermally expandable material 32a is formed at the portion of the thermally expansive layer 30 that corresponds to the protrusion 36, and the thermally expandable material 32c that is expanded less than the expanded thermally expandable material 32a is formed at the portion of the thermally expansive layer 30 that corresponds to the recess 38. Moreover, the portion of the thermally expansive layer 30 that corresponds to the protrusion 36 and the portion of the thermally expansive layer 30 that corresponds to the recess 38 distend and, as a result, the protrusion 36, the recess 37, and the recess 38 of the thermally expansive layer 30 are formed, and the unevenness 39 is formed on the surface 34 of the thermally expansive layer 30.

In the present embodiment, as in Embodiment 1, the coefficient of extension of the adhesive layer 42 of the brushed layer 40 is 30% or greater and, as such, the adhesive layer 46 extends. As a result, the unevenness 39 can be easily formed on the surface 34 of the thermally expansive layer 30. In addition, the unevenness 39 can be easily formed on the surface of the shaped object 100. Thus, the shaped object 100 can be produced.

As described above, the thermally expandable material 32 is caused to expand, and this expansion causes the thermally expansive layer 30 laminated on the brushed layer 40 to distend, thereby forming the unevenness 39. As such, the shaped object 100 includes a uniform brushed layer 40 on the surface 34 that includes the unevenness 39. Additionally, with the production method of the shaped object 100 of the present embodiment, a shaped object 100 that includes a uniform brushed layer 40 on the surface 34 that includes the unevenness 39 can easily be produced. It is sufficient that the recesses 37 and 38 of the thermally expansive layer 30 include the thermally expandable material 32b or 32c that are expanded less than the expanded thermally expandable material 32a of the protrusion 36.

Embodiment 3

The shaped objects 100 of Embodiments 1 and 2 include the heat conversion layer 110, but the shaped object 100 need not include the heat conversion layer 110.

Figure 9:
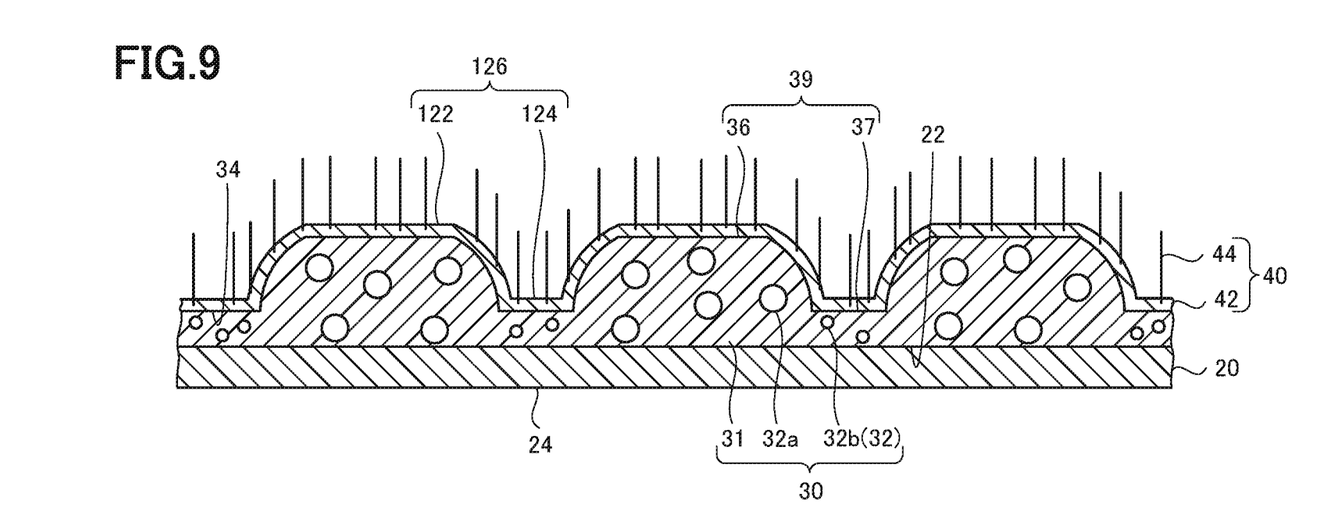
FIG. 9 is a schematic drawing illustrating a cross-section of a shaped object according to Embodiment 3 of the present disclosure.

As illustrated in FIG. 9, the shaped object 100 of the present embodiment includes a base 20, a thermally expansive layer 30, and a brushed layer 40, but does not include a heat conversion layer 110. The configurations of the base 20, the thermally expansive layer 30, and the brushed layer 40 of the present embodiment are similar to the base 20, the thermally expansive layer 30, and the brushed layer 40 of Embodiment 1. Here, the molding sheet 10 used in the production of the shaped object 100 of the present embodiment and a production method for the shaped object 100 of the present embodiment will be described.

Figure 10:
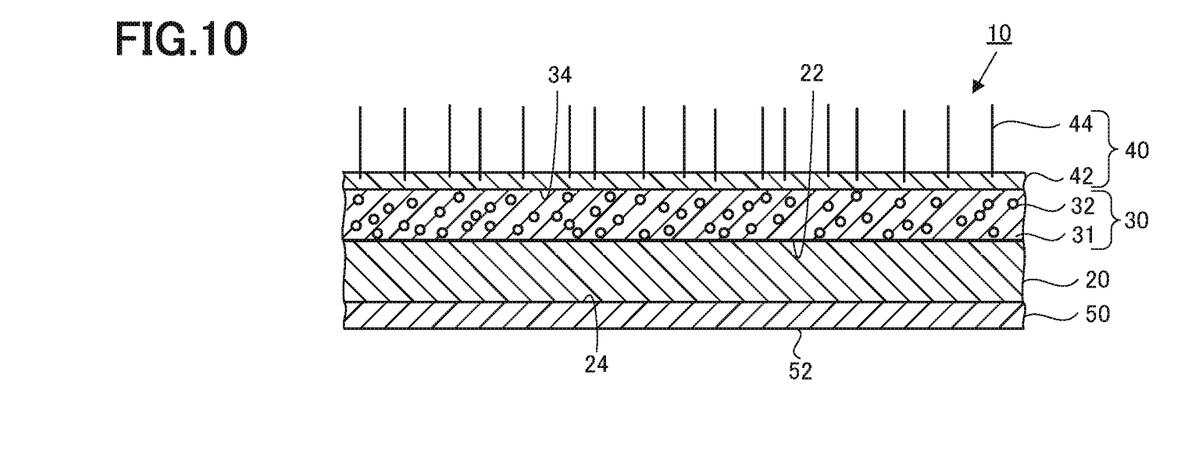
FIG. 10 is a schematic drawing illustrating a cross-section of a molding sheet according to Embodiment 3 of the present disclosure.

As illustrated in FIG. 10, the molding sheet 10 of the present embodiment includes the base 20, the thermally expansive layer 30, the brushed layer 40, and a release layer 50. Since the base 20, the thermally expansive layer 30, and the brushed layer 40 of the present embodiment are similar to the base 20, the thermally expansive layer 30, and the brushed layer 40 of Embodiment 1, the release layer 50 will be described.

The release layer 50 of the molding sheet 10 is provided on the second main surface 24 of the base 20. The release layer 50 can be peeled from the second main surface 24. In one example, the release layer 50 is formed from a commercially available release film. Release films are resin films that are formed from PET, PE, or the like. The surface of the release film to be released is subjected to a releasing treatment (for example, silicon coating treatment).

Next, a production method for the molding sheet 10 of the present embodiment will be described. The production method for the molding sheet 10 of the present embodiment includes a thermally expansive layer laminating step of laminating the thermally expansive layer 30 onto the first main surface 22 of the base 20 (step S10), a first brushed layer laminating step of laminating the brushed layer 40 onto the surface 34 of the thermally expansive layer 30 on the side opposite to the base 20 (step S20), and a step of providing the release layer 50 on the second main surface 24 of the base 20 (step S25).

The thermally expansive layer laminating step (step S10) and the first brushed layer laminating step (step S20) of the present embodiment are similar to the thermally expansive layer laminating step (step S10) and the first brushed layer laminating step (step S20) of Embodiment 1. In the step of providing the release layer 50 (step S25), the release layer 50 is provided by affixing a release film to the second main surface 24 of the base 20. Thus, the molding sheet 10 of the present embodiment can be produced.

Figure 11:
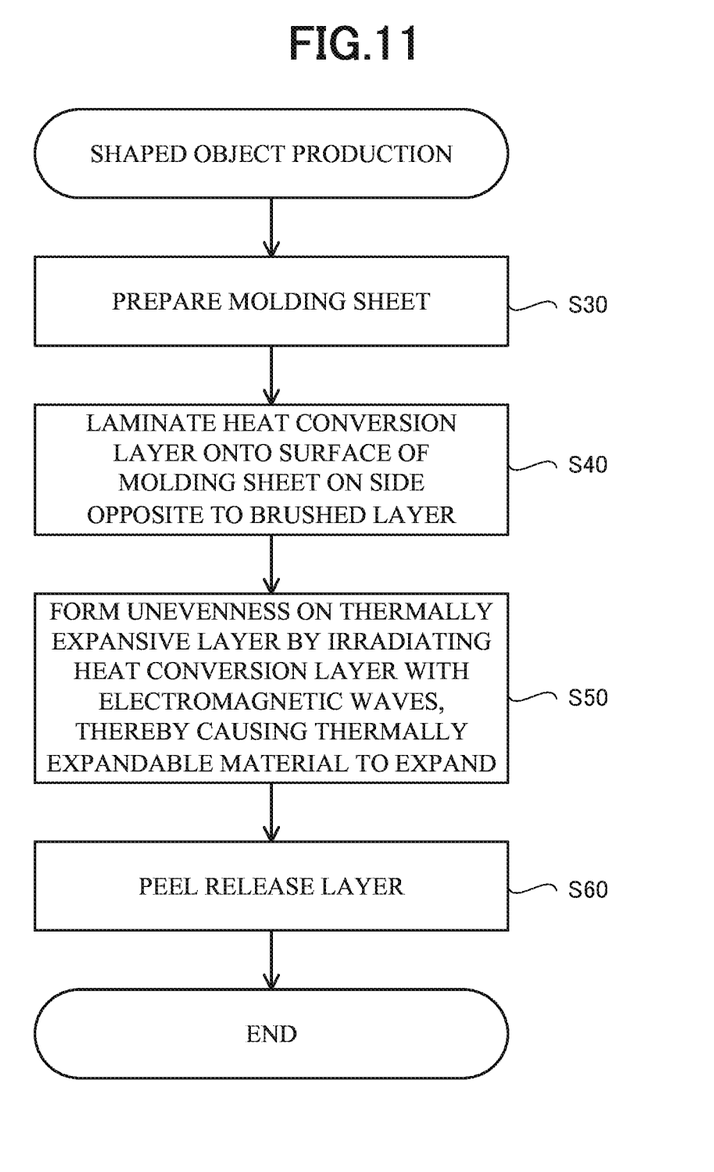
FIG. 11 is a flowchart illustrating a production method for the shaped object according to Embodiment 3 of the present disclosure.
Figure 12:
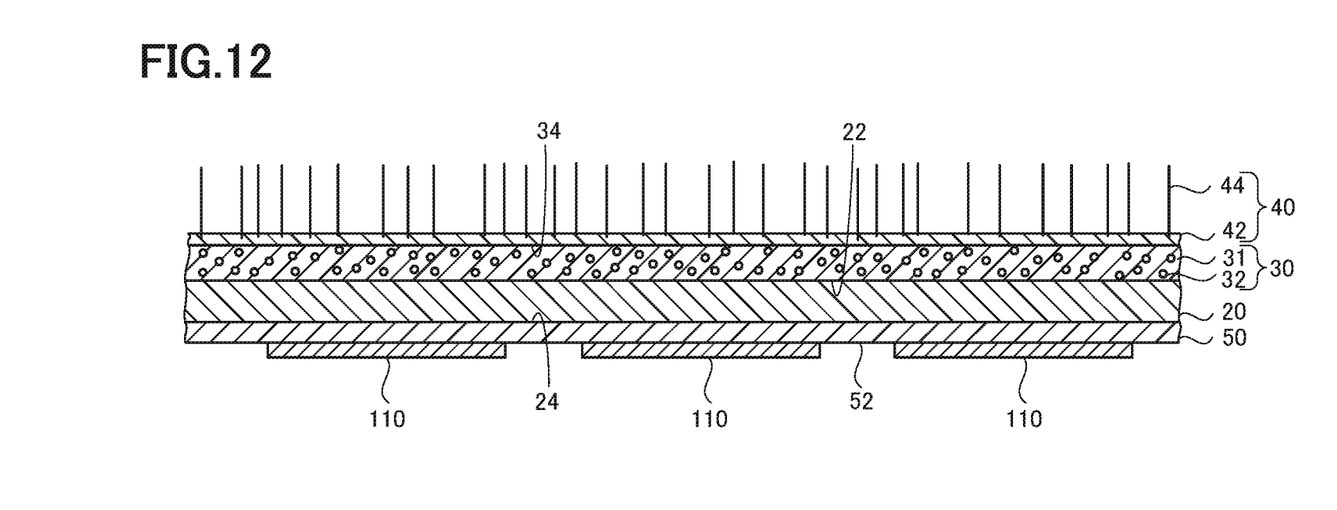
FIG. 12 is a schematic drawing illustrating a cross-section of the molding sheet according to Embodiment 3 of the present disclosure, on which a heat conversion layer is laminated.

Next, a production method for the shaped object 100 of the present embodiment will be described with reference to FIGS. 11 and 12. FIG. 11 is a flowchart illustrating the production method for the shaped object 100 of the present embodiment. The production method for the shaped object 100 of the present embodiment includes a first preparation step of preparing the molding sheet 10 on which the release layer 50 is provided (step S30); a first heat conversion layer laminating step of laminating the heat conversion layer 110 that converts electromagnetic waves into heat onto the surface of the molding sheet 10 on the side opposite to the brushed layer 40 (that is, on a surface 52 of the release layer 50) (step S40); and a first unevenness forming step of irradiating the heat conversion layer with electromagnetic waves to cause the thermally expandable material 32 of the molding sheet 10 to expand, thereby forming the unevenness 39 on the surface 34 of the thermally expansive layer 30 on the side opposite to the base 20 (step S50). Furthermore, the production method for the shaped object 100 of the present embodiment includes a peeling step of peeling the release layer 50 (step S60).

In the first preparation step (step S30), first, the molding sheet 10 on which the release layer 50 is provided and an ink containing the heat conversion material are prepared. In one example, the molding sheet 10 on which the release layer 50 is provided is produced via the production method of the present embodiment described above (step S10 to step S25). The ink that contains the heat conversion material is carbon black-containing ink, for example.

In the first heat conversion layer laminating step (step S40), the carbon black-containing ink is printed, in a pattern that corresponds to the unevenness 39 to be formed on the surface 34 of the thermally expansive layer 30, on the surface 52 of the release layer 50 (that is, on the surface of the molding sheet 10 on the side opposite to the brushed layer 40) by the printing device. As a result, as illustrated in FIG. 12, the heat conversion layer 110 is laminated on the surface 52 of the release layer 50. With the exception of the heat conversion layer 110 being laminated on the surface 52 of the release layer 50, the first heat conversion layer laminating step (step S40) of the present embodiment is similar to the first heat conversion layer laminating step (step S40) of Embodiment 1.

Next, returning to FIG. 11, in the first unevenness forming step (step S50), the heat conversion layer 110 is irradiated with electromagnetic waves, thereby causing heat to be released and the thermally expandable material 32 of the molding sheet 10 to expand. As a result, the unevenness 39 is formed on the surface 34 of the thermally expansive layer 30 on the side opposite to the base 20. With the exception of the heat conversion layer 110 being formed on the surface 52 of the release layer 50, the first unevenness forming step (step S50) of the present embodiment is similar to the first unevenness forming step (step S50) of Embodiment 1.

Finally, in the peeling step (step S60), the release layer 50 is peeled from the second main surface 24 of the base 20. As a result, the heat conversion layer 110 that is formed on the surface 52 of the release layer 50 is removed together with the release layer 50. Thus, a shaped object 100, which does not include the heat conversion layer 110, can be easily produced.

As described above, in the present embodiment, as in Embodiment 1, the thermally expandable material 32 is caused to expand, and this expansion causes the thermally expansive layer 30 laminated on the brushed layer 40 to distend, thereby forming the unevenness 39. As such, the shaped object 100 of the present embodiment includes a uniform brushed layer 40 on the surface 34 that includes the unevenness 39. Additionally, with the production method for the shaped object 100 of the present embodiment, a shaped object 100 that includes a uniform brushed layer 40 on the surface 34 that includes the unevenness 39, but does not include a heat conversion layer 110, can easily be produced.

Embodiment 4

In Embodiments 1 to 3, the shaped object 100 is produced from a molding sheet 10 that includes a brushed layer 40, but the shaped object 100 may be produced from a molding sheet 10 that does not include a brushed layer 40.

As with the shaped object 100 of Embodiment 1 illustrated in FIG. 7, the shaped object 100 of the present embodiment includes a base 20, a thermally expansive layer 30 that includes an unevenness 39 on a surface 34 of a side opposite to the base 20, a brushed layer 40, and a heat conversion layer 110. The configuration of the shaped object 100 of the present embodiment is similar to that of the shaped object 100 of Embodiment 1. As such, the molding sheet 10 used in the production of the shaped object 100 of the present embodiment and a production method for the shaped object 100 of the present embodiment will be described.

Figure 13:
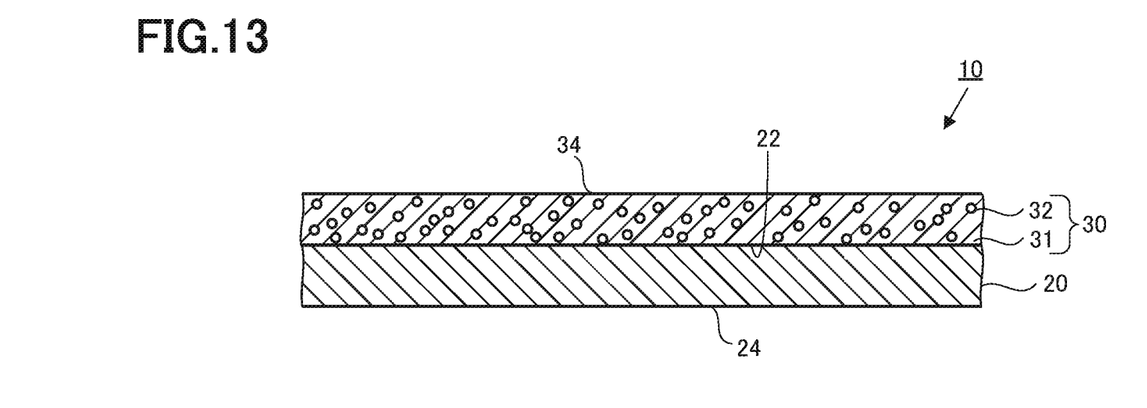
FIG. 13 is a schematic drawing illustrating a cross-section of a molding sheet according to Embodiment 4 of the present disclosure.

As illustrated in FIG. 13, the molding sheet 10 of the present embodiment includes a base 20, and a thermally expansive layer 30 laminated on a first main surface 22 of the base 20, but does not include a brushed layer 40. The configurations of the base 20 and the thermally expansive layer 30 of the present embodiment are similar to those in Embodiment 1. The molding sheet 10 of the present embodiment is produced via the thermally expansive layer laminating step (step S10) of Embodiment 1.

Figure 14:
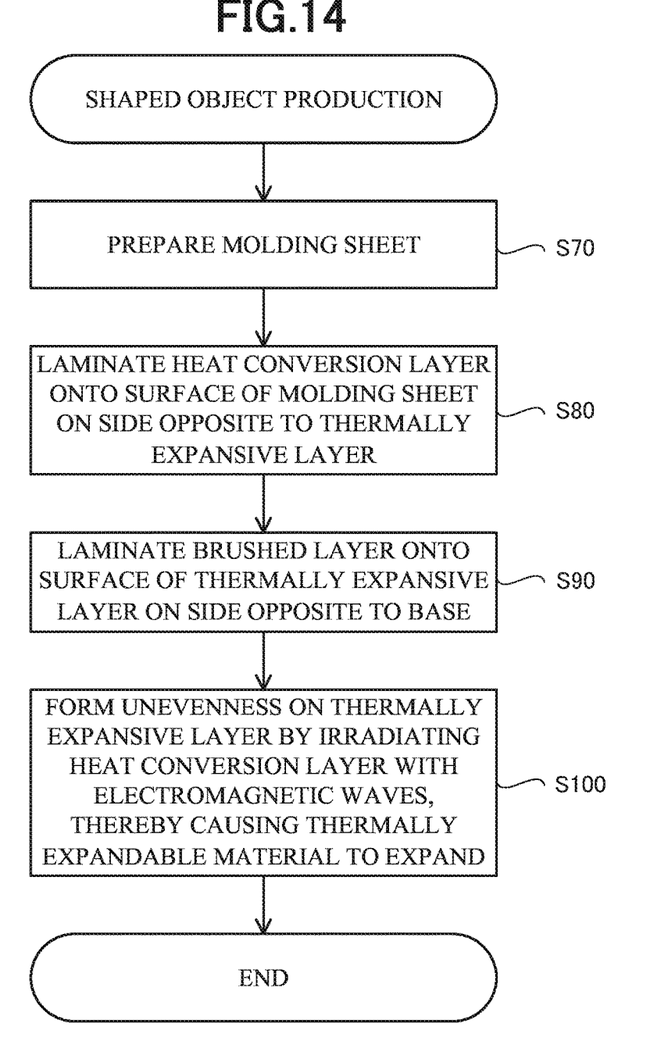
FIG. 14 is a flowchart illustrating a production method for the shaped object according to Embodiment 4 of the present disclosure.
Figure 15:
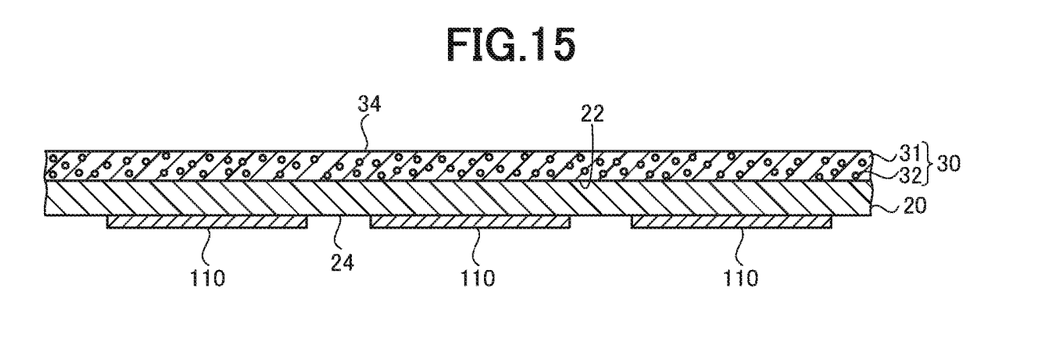
FIG. 15 is a schematic drawing illustrating a cross-section of the molding sheet according to Embodiment 4 of the present disclosure, on which a heat conversion layer is laminated.

Next, a production method for the shaped object 100 of the present embodiment will be described with reference to FIGS. 14 and 15. FIG. 14 is a flowchart illustrating the production method for the shaped object 100 of the present embodiment. The production method for the shaped object 100 of the present embodiment includes a second preparation step of preparing a molding sheet 10 that includes the base 20 and the thermally expansive layer 30 laminated on the first main surface 22 of the base 20 (step S70); a second heat conversion layer laminating step of laminating a heat conversion layer 110 that converts electromagnetic waves into heat onto the surface of the molding sheet 10 on the side opposite to the thermally expansive layer 30 (that is, on the second main surface 24 of the base 20) (step S80); a second brushed layer laminating step of laminating a brushed layer 40 that includes fiber 44 onto the surface 34 of thermally expansive layer 30 of the molding sheet 10 on the side opposite to the base 20 (step S90); and a second unevenness forming step of irradiating the heat conversion layer 110 with electromagnetic waves to cause the thermally expandable material 32 to expand, thereby forming the unevenness 39 on the surface 34 of the thermally expansive layer 30 on the side opposite to the base 20 (step S100).

In the second preparation step (step S70), the molding sheet 10 including the base 20 and the thermally expansive layer 30 laminated on the first main surface 22 of the base 20, and an ink containing the heat conversion material are prepared. In one example, the molding sheet 10 including the base 20 and the thermally expansive layer 30 laminated on the first main surface 22 of the base 20 is produced via the production method for the molding sheet of the embodiments described above (step S10). The ink that contains the heat conversion material is carbon black-containing ink, for example.

Next, in the second heat conversion layer laminating step (step S80), as in the first heat conversion layer laminating step (step S40) of Embodiment 1, the carbon black-containing ink is printed, in a pattern that corresponds to the unevenness 39 to be formed on the surface 34 of the thermally expansive layer 30, on the second main surface 24 of the base (that is, on the surface of the molding sheet 10 on the side opposite to the brushed layer 40) by the printing device. With the exception of the molding sheet 10 not including the brushed layer 40, the second heat conversion layer laminating step (step S80) of the present embodiment is similar to the first heat conversion layer laminating step (step S40) of Embodiment 1.

Next, in the second brushed layer laminating step (step S90), as in the first brushed layer laminating step (step S20) of the production method for the molding sheet 10 of Embodiment 1, an ultraviolet curable adhesive is coated on the surface 34 of the thermally expansive layer 30 of the molding sheet 10. Next, the fiber 44 is flocked on the coated ultraviolet curable adhesive. In one example, the fiber 44 is flocked by electrostatic flocking.

In the second unevenness forming step (step S100), as in the first unevenness forming step (step S50) of Embodiment 1, the heat conversion layer 110 is irradiated with electromagnetic waves, thereby causing heat to be released and the thermally expandable material 32 of the molding sheet 10 to expand. As a result, the unevenness 39 is formed on the surface 34 of the thermally expansive layer 30. Thus, the shaped object 100 can be produced.

As described above, the shaped object 100 may be produced by laminating the heat conversion layer 110 on the molding sheet 10 that does not include the brushed layer 40, then laminating the brushed layer 40, and forming the unevenness 39 on the surface 34 of the thermally expansive layer 30 on the side opposite to the base 20. Moreover, in the present embodiment, the thermally expandable material 32 is caused to expand, and this expansion causes the thermally expansive layer 30 laminated on the brushed layer 40 to distend, thereby forming the unevenness 39. As such, the shaped object 100 of the present embodiment includes a uniform brushed layer 40 on the surface 34 that includes the unevenness 39. Additionally, with the production method of the shaped object 100 of the present embodiment, a shaped object 100 that includes a uniform brushed layer 40 on the surface 34 that includes the unevenness 39 can easily be produced.

Embodiments of the present disclosure have been described, but various modifications can be made to the present disclosure without departing from the spirit and scope of the present disclosure.

For example, a configuration is possible in which the molding sheet 10 is produced in a roll shape, and the shaped object 100 is produced in a roll-shape from the roll-shape molding sheet 10.

The material of the base 20 is not limited to thermoplastic resins. The material of the base 20 may be paper, fabric, or the like. The thermoplastic resin of the base 20 is not limited to polyolefin resins and polyester resins. The thermoplastic resin of the base 20 may be a polyamide resin, a polyvinyl chloride (PVC) resin, a polyimide resin, or the like.

In Embodiments 1 to 4, the unevenness 39 of the thermally expansive layer 30 of the shaped object 100 is formed by causing the thermally expandable material 32 of the molding sheet 10 to expand. Since the thermally expansive layer 30 of the molding sheet 10 distends due to the expansion of the thermally expandable material 32, the unevenness 39 of the thermally expansive layer 30 of the shaped object 100 can also be understood to be formed by differences in the amount of distension of the thermally expansive layer 30 of the molding sheet 10.

The adhesive layer 42 of the brushed layer 40 is not limited to an ultraviolet curable adhesive. A configuration is possible in which the adhesive layer 42 is formed from an acrylic-based emulsion adhesive, a urethane-based adhesive, or the like.

The fiber 44 of the brushed layer 40 is not limited to being formed from nylon 66 or rayon. A configuration is possible in which the fiber 44 is formed from cotton, textile processed into fiber, or the like. The material, length, flocking conditions, and the like can be changed to change the texture/feel of the brushed layer 40 and also impart the various effects of the brushed layer 40 to the shaped object 100. For example, when long fiber 44 that is not prone to bending (for example, nylon 66 with a length of 0.8 mm) is flocked at a high density of 10,000,000 fibers per 1 m², the brushed layer 40 (the portion of the fiber 44 exposed from the surface) can hold a large amount of air. In such a case, the brushed layer 40 can impart thermal insulating effects, and the shaped object 100 will have thermal insulating properties. Additionally, since the brushed layer 40 vibrates due to sound, thereby converting sound into heat, the brushed layer 40 can impart soundproofing effects, and the shaped object 100 will have soundproofing properties. Accordingly, the brushed layer 40 can express thermal insulating properties and soundproofing properties.

When, for example, the fiber 44 is formed from rayon, due to the high hygroscopic properties of rayon, the brushed layer 40 can impart hygroscopic effects and condensation prevention effects, and the shaped object 100 will have hygroscopic properties. Furthermore, the brushed layer 40 imparts braking effects (anti-slip effects) due to the fiber 44, and the shaped object 100 has braking properties. The brushed layer 40 is also expressed as a hygroscopic layer or a braking layer.

The release layer 50 of Embodiment 3 is not limited to resin films that have been subjected to a releasing treatment. For example, the release layer 50 may be implemented as a resin film that is affixed via an adhesive.

Additionally, in Embodiment 4, a configuration is possible in which the release layer 50 is provided on the second main surface 24 of the base 20 of the molding sheet 10. In this case, the heat conversion layer 110 is laminated on the surface 52 of the release layer 50 that is provided on the molding sheet 10 (second heat conversion layer laminating step; step S80). Moreover, after the unevenness 39 is formed on the thermally expansive layer 30, the release layer 50 is peeled from the second main surface 24 of the base 20 (peeling step; step S60).

In the production method of Embodiment 4, the shaped object 100 is produced by performing, in order, the second heat conversion layer laminating step (step S80), the second brushed layer laminating step (step S90), and the second unevenness forming step (step S100). A configuration is possible in which the shaped object 100 is produced by performing, in order, the second brushed layer lamination step (step S90), the second heat conversion layer laminating step (step S80), and the second unevenness forming step (step S100). That is, the shaped object 100 may be produced by laminating the brushed layer 40 on the molding sheet that does not include the brushed layer 40 and, thereafter, laminating the heat conversion layer 110, and forming the unevenness 39 on the surface 34 of the thermally expansive layer on the side opposite to the base 20.

In the second heat conversion layer laminating step of Embodiment 4 (step S80), the heat conversion layer 110 is laminated on the surface of the molding sheet 10 on the side opposite to the thermally expansive layer 30. However, a configuration is possible in which, in the second heat conversion layer laminating step (step S80), the heat conversion layer 110 is laminated on the surface 34 of the thermally expansive layer 30 on the side opposite to the base 20. In this case, the brushed layer 40 may be laminated on the surface 34 of the thermally expansive layer 30 on the side opposite to the base 20 and on the heat conversion layer 110.

The molding sheets 10 and the shaped objects 100 of Embodiments 1 to 4 may include other layers of desired materials between the layers described above. For example, a configuration is possible in which an adhesive layer, which causes the thermally expansive layer 30 to be more strongly adhered to the base 20, is formed between the base 20 and the thermally expansive layer 30. The adhesive layer is formed from a surface modifier, for example.

A configuration is possible in which a color image is printed on the shaped object 100 of the molding sheet 10. For example, a color ink layer that expresses a color image may be laminated between the thermally expansive layer 30 and the brushed layer 40 of the molding sheet 10 and the shaped object 100. Here, the color ink layer is formed from inks of four colors, namely cyan (C), magenta (M), yellow (Y), and black (K). The color image may be printed on the brushed layer 40. By printing the color image on the brushed layer 40, a clearer image can be formed on the shaped object 100. Additionally, by coloring the brushed layer 40 by dying, printing, or the like, a shaped object 100 with greater coloration can be realized. The ink used in the printing may be pigment-based ink or dye-based ink.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A shaped object production method, comprising:
    preparing a molding sheet comprising a laminated structure including a base, a thermally expansive layer on a first main surface of the base, and a brushed layer on a surface of the thermally expansive layer on a side that is opposite from the base, wherein the thermally expansive layer includes a thermally expandable material, and the brushed layer includes fiber;
    laminating a heat conversion layer, which comprises a heat conversion material, onto a surface of the molding sheet on a side that is opposite from the brushed layer, the heat conversion layer being configured to convert electromagnetic waves into heat; and
    forming an unevenness on the surface of the thermally expansive layer on the side that is opposite from the base by irradiating the heat conversion layer with electromagnetic waves, thereby causing the thermally expandable material to expand,
    wherein the heat conversion layer includes a first portion and a second portion, the first portion has a higher density of the heat conversion material than the second portion, and both the first and second portions overlap with the brushed layer in a thickness direction of the molding sheet,
    wherein forming the unevenness by irradiating the heat conversion layer with electromagnetic waves causes the first portion of the heat conversion layer to emit more heat than the second portion of the heat conversion layer, thereby causing a first part of the thermally expansive layer that overlaps the first portion of the heat conversion material to expand to a first height and a second part of the thermally expansive layer that overlaps the second portion of the heat conversion material to expand to a second height, the first height being greater than the second height, and
    wherein the brushed layer is provided over both the first part of the thermally expansive layer expanded to the first height and the second part of the thermally expansive layer expanded to the second height.

2. The shaped object production method according to claim 1, wherein:
the brushed layer includes an adhesive layer having a coefficient of extension of 30% or greater, and
the fiber is flocked on the adhesive layer.

3. The shaped object production method according to claim 2, wherein:
the adhesive layer is an ultraviolet curable adhesive, and
the fiber is flocked on the adhesive layer by electrostatic flocking.

4. The shaped object production method according to claim 1, wherein the heat conversion layer includes lanthanum hexaboride or cesium tungsten oxide.

5. The shaped object production method according to claim 1, wherein:
the molding sheet further includes a release layer on a second main surface of the base that is opposite from the first main surface, the release layer being peelable,
the heat conversion layer is laminated onto the release layer, and
the shaped object production method further comprises peeling the release layer after the unevenness is formed.

6. The shaped object production method according to claim 5, wherein the release layer is a resin film.

7. A shaped object production method, comprising:
preparing a molding sheet comprising a laminated structure including a base and a thermally expansive layer on a first main surface of the base, the thermally expansive layer including a thermally expandable material;
laminating a brushed layer onto a surface of the thermally expansive layer on a side that is opposite from the base, the brushed layer including fiber;
of laminating a heat conversion layer, which comprises a heat conversion material, onto a surface of the molding sheet on a side that is opposite from the thermally expansive layer or onto the surface of the thermally expansive layer on the side that is opposite from the base, the heat conversion layer being configured to convert electromagnetic waves into heat; and
forming an unevenness on the surface of the thermally expansive layer on the side that is opposite from the base by irradiating the heat conversion layer with electromagnetic waves, thereby causing the thermally expandable material to expand,
wherein the heat conversion layer includes a first portion and a second portion, the first portion has a higher density of the heat conversion material than the second portion, and both the first and second portions overlap with the brushed layer in a thickness direction of the molding sheet,
wherein forming the unevenness by irradiating the heat conversion layer with electromagnetic waves causes the first portion of the heat conversion layer to emit more heat than the second portion of the heat conversion layer, thereby causing a first part of the thermally expansive layer that overlaps the first portion of the heat conversion material to expand to a first height and a second part of the thermally expansive layer that overlaps the second portion of the heat conversion material to expand to a second height, the first height being greater than the second height, and
wherein the brushed layer is provided over both the first part of the thermally expansive layer expanded to the first height and the second part of the thermally expansive layer expanded to the second height.

8. The shaped object production method according to claim 7, wherein:
the brushed layer includes an adhesive layer having a coefficient of extension of 30% or greater, and
the fiber is flocked on the adhesive layer.

9. The shaped object production method according to claim 8, wherein:
the adhesive layer is an ultraviolet curable adhesive, and
the fiber is flocked on the adhesive layer by electrostatic flocking.

10. The shaped object production method according to claim 7, wherein the heat conversion layer includes lanthanum hexaboride or cesium tungsten oxide.

11. The shaped object production method according to claim 7, wherein:
the molding sheet further includes a release layer on a second main surface of the base that is opposite from the first main surface, the release layer being peelable,
the heat conversion layer is laminated onto the release layer, and
the shaped object production method further comprises peeling the release layer after the unevenness is formed.

12. The shaped object production method according to claim 11, wherein the release layer is a resin film.

13. A shaped object production method, comprising:
laminating a thermally expansive layer onto a first main surface of a base, the thermally expansive layer including a thermally expandable material;
laminating a brushed layer onto a surface of the thermally expansive layer on a side that is opposite from the base;
laminating a heat conversion layer, which comprises a heat conversion material, onto a surface of the base on a side that is opposite from the thermally expansive layer or onto the surface of the thermally expansive layer on the side that is opposite from the base, the heat conversion layer being configured to convert electromagnetic waves into heat; and
forming an unevenness on the surface of the thermally expansive layer on the side that is opposite from the base by irradiating the heat conversion layer with electromagnetic waves, thereby causing the thermally expandable material to expand,
wherein the heat conversion layer includes a first portion and a second portion, the first portion has a higher density of the heat conversion material than the second portion, and both the first and second portions overlap with the brushed layer in a thickness direction of the molding sheet,
wherein forming the unevenness by irradiating the heat conversion layer with electromagnetic waves causes the first portion of the heat conversion layer to emit more heat than the second portion of the heat conversion layer, thereby causing a first part of the thermally expansive layer that overlaps the first portion of the heat conversion material to expand to a first height and a second part of the thermally expansive layer that overlaps the second portion of the heat conversion material to expand to a second height, the first height being greater than the second height, and
wherein the brushed layer is provided over both the first part of the thermally expansive layer expanded to the first height and the second part of the thermally expansive layer expanded to the second height.

14. The shaped object production method according to claim 13, wherein the brushed layer includes an adhesive layer having a coefficient of extension of 30% or greater.

* * * * *